US008654712B2

(12) United States Patent
Julian et al.

(10) Patent No.: US 8,654,712 B2
(45) Date of Patent: Feb. 18, 2014

(54) OFDMA REVERSE LINK SCHEDULING

(75) Inventors: David Jonathan Julian, San Diego, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 1548 days.

(21) Appl. No.: 11/452,722

(22) Filed: Jun. 13, 2006

(65) Prior Publication Data
US 2006/0293076 A1 Dec. 28, 2006

Related U.S. Application Data

(60) Provisional application No. 60/691,470, filed on Jun. 16, 2005.

(51) Int. Cl.
*H04W 4/00* (2009.01)
*H04W 72/00* (2009.01)

(52) U.S. Cl.
USPC ........ 370/329; 455/450; 455/451; 455/452.1; 455/452.2

(58) Field of Classification Search
USPC ............ 370/329; 455/450, 451, 452.1, 452.2, 455/453, 454
See application file for complete search history.

(56) References Cited

U.S. PATENT DOCUMENTS

| | | | |
|---|---|---|---|
| 5,835,566 A | 11/1998 | Cowgill | |
| 5,940,006 A * | 8/1999 | MacLellan et al. | 340/10.1 |
| 7,012,912 B2 | 3/2006 | Naguib et al. | |
| 7,016,649 B1 * | 3/2006 | Narasimhan et al. | 455/63.1 |
| 7,373,151 B1 * | 5/2008 | Ahmed | 455/452.2 |
| 8,098,667 B2 | 1/2012 | Julian et al. | |
| 2001/0040880 A1 * | 11/2001 | Chen et al. | 370/337 |
| 2002/0042275 A1 * | 4/2002 | Kitazawa et al. | 455/452 |
| 2002/0111183 A1 * | 8/2002 | Lundby | 455/522 |
| 2002/0131479 A1 * | 9/2002 | Butler et al. | 375/147 |
| 2002/0160783 A1 * | 10/2002 | Holtzman et al. | 455/452 |

(Continued)

FOREIGN PATENT DOCUMENTS

| | | |
|---|---|---|
| CN | 1484928 A | 3/2004 |
| EP | 1089458 A2 | 4/2001 |

(Continued)

OTHER PUBLICATIONS

Wong et. al. (Multi user OFDM with Adaptive Subcarrier, Bit, and Power Allocation; IEEE Journal on Selected Areas in Communications, vol. 17, No. 10, Oct. 1999, pp. 1747-1758).*

(Continued)

*Primary Examiner* — Vladimir Magloire
*Assistant Examiner* — Edd Rianne Plata
(74) *Attorney, Agent, or Firm* — Mary A. Fales

(57) ABSTRACT

Systems and methodologies are described that facilitate scheduling via a power control algorithm that dynamically update a scheduling metric (e.g., adjusting transmission power for sub-carriers) based on a prediction function and/or inference model of expected power requirements. In one aspect, the power prediction component can include two further components, namely: the data channel component and the control channel component—wherein a carrier to interference ratio (C/I) information is being transmitted on such control channel and the power is adjusted to obtain performance requirements. Accordingly, an efficient scheduling of users on a reverse link in an orthogonal manner can be provided, to optimally use system resources, while simultaneously: maintaining a predetermined and/or arbitrary fairness metrics, maintaining quality of service and maximizing throughput.

51 Claims, 13 Drawing Sheets

(56) References Cited

U.S. PATENT DOCUMENTS

| | | | |
|---|---|---|---|
| 2003/0013451 A1* | 1/2003 | Walton | 455/447 |
| 2003/0037146 A1* | 2/2003 | O'Neill | 709/226 |
| 2003/0050084 A1* | 3/2003 | Damnjanovic et al. | 455/522 |
| 2003/0083093 A1* | 5/2003 | Yun et al. | 455/522 |
| 2003/0156556 A1* | 8/2003 | Puig-Oses et al. | 370/328 |
| 2003/0236080 A1* | 12/2003 | Kadous et al. | 455/226.1 |
| 2004/0102202 A1* | 5/2004 | Kumaran et al. | 455/515 |
| 2004/0131014 A1* | 7/2004 | Thompson et al. | 370/230 |
| 2004/0141473 A1* | 7/2004 | Buot | 370/311 |
| 2004/0242257 A1* | 12/2004 | Valkealahti et al. | 455/522 |
| 2005/0020213 A1* | 1/2005 | Azman et al. | 455/67.11 |
| 2005/0053035 A1 | 3/2005 | Kwak et al. | |
| 2005/0113106 A1* | 5/2005 | Duan et al. | 455/452.2 |
| 2006/0182022 A1* | 8/2006 | Abedi | 370/229 |
| 2012/0093136 A1 | 4/2012 | Julian et al. | |

FOREIGN PATENT DOCUMENTS

| | | |
|---|---|---|
| JP | 2003319468 A | 11/2003 |
| KR | 20020088055 | 11/2002 |
| RU | 2216100 | 11/2003 |
| RU | 2263415 | 10/2005 |
| TW | 378481 | 1/2000 |
| TW | 512600 | 1/2002 |
| TW | 545002 | 1/2003 |
| TW | 569561 | 1/2004 |
| WO | 0239760 | 5/2002 |
| WO | WO2005104461 A1 | 11/2005 |
| WO | WO2006019710 | 2/2006 |

OTHER PUBLICATIONS

Goyal et al., "Start-time fair queuing: A Scheduling algorithm for integrated services packet switching networks," URL: http://delivery.acm.org/10.1145/250000/248171/p157-goyal.pdf?key1=248171&key2=7247621611&coll-GUIDE&dl-GUIDE&CFID=2591702&CFTOKEN=71400686, retrieved on Oct. 18, 2006.

QUALCOMM Incorporated, "QFDD Technology Overview Presentation; IEEE c802.20-05-59rl" URL: http://www.ieee802.org/20/Contribs/>, retrieved on Oct. 18, 2006.

Karman Ramchandran et al. "Multiresolution Broadcast for Digital HDTV Using Joint Source/Channel Coding".

International Search Report—PCT/US06/023508—International Search Authority, European Patent Office—Nov. 8, 2006.

Written Opinion—PCT/US06/023508—International Search Authority, European Patent Office—Nov. 8, 2006.

International Preliminary Report on Patentability—PCT/US06/023508—The International Bureau of WIPO, Geneva, Switzerland—Dec. 17, 2007.

Taiwan Search Report—TW095121762—TIPO—Jul. 1, 2011.

Larsson, P. and N. Johansson. "Multiuser Diversity Forwarding in Multihop Packet Radio Networks." Proceedings of IEEE Wireless Communications and Networking Conference, Mar. 2005. vol. 4, pp. 2188-2194.

LG Electronics Inc: "Control Information Transfer in MAC Layer", 3GPP TSG RAN WG2 Meeting #45 R2-042462, Nov. 19, 2004.

* cited by examiner

OFDMA REVERSE LINK SCHEDULING

CLAIM OF PRIORITY UNDER 35 U.S.C. §119

This application claims the benefit of U.S. Provisional Application Ser. No. 60/691,470, entitled "METHODS AND APPARATUS FOR RESOURCE ASSIGNMENT IN OFDMA REVERSE LINK," filed Jun. 16, 2005, and assigned to the assignee hereof and hereby expressly incorporated by reference herein.

BACKGROUND

I. Field

The following description relates generally to wireless communications, and more particularly to efficient scheduling in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information, e.g., in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

In a centrally scheduled cellular reverse link, the base station (BTS) typically gathers information to make assignments, determines what resources to allocate to each access terminal (AT), and sends such assignments to the access terminals (AT). Such access terminals receive and process the assignments, and send back data on the assigned reverse link channels. As such, there exists a plurality of challenges with respect to the centralized reverse link scheduler. For example, such challenges can include allocating resources to users based on achieving different levels of fairness among users, meeting quality of service requirements, accounting for assignment granularities and the number of available assignments. Another example of the challenges involved include collecting the information to make scheduling decisions in an efficient manner, meeting quality of service requirements, properly interacting with the power control algorithms, avoiding and managing fragmentation of resources, determining the transmission rates, and the like.

Therefore, a need exists in the art for systems and methods that facilitate efficient scheduling in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject innovation provides for scheduling systems and methods that employ a power control algorithm, to dynamically update a scheduling metric(s) (e.g., adjusting transmission power for sub-carriers), based on a prediction function and/or inference model of expected power requirements. Such can supply an efficient scheduling of users on a reverse link in an orthogonal manner, to optimally use system resources (e.g., not scheduling some users for particular sub-carriers), while simultaneously: maintaining a predetermined and/or arbitrary fairness metrics (e.g. every user sending same number of bits per second, every user having access to same number of resources, and the like), maintaining quality of service (QoS) and maximizing throughput.

Moreover associated over head can also be regulated, to mitigate fragmentation and allow optimal system usage, during sub-carrier and packet format scheduling. For example, by taking advantage of sticky assignment, users can then be swapped in-and-out, while maintaining fairness. The number of assignments can be initially identified per unit of time, per frame, followed by taking out a user(s) and swapping in another user(s) instead, while at the same time maintaining the fairness metrics as defined for the system.

According to a further embodiment, the power prediction component can include two further components, namely: the data channel component and the control channel component. The control channel component (e.g., power controller) can be a closed loop power controller (e.g. 85 Hz), wherein a carrier to interference ratio (C/I) information is being transmitted on such control channel and the power is adjusted to obtain performance requirements. In one aspect, a rate prediction that is associated with the power prediction component is a function of how much power is required to be transmitted. A power spectral density (PSD) that signifies amount of power per carrier can be employed, as an index of power transfer (instead of the actual power itself). For example, in the distributed power control algorithm, the access terminal can report the power spectral density per sub-carrier as an offset (delta) from the closed loop power controlled pilot (or an offset from a dedicated control channel transmit power level, wherein the control channel can be closed loop power controlled to a given level of performance.) Accordingly, the data channel can be sent at an offset from the power use for control channel, and upon determining such offset, the PSD that a user supports can also be determined. By examining behavior of assigning base stations, transmit power can then be predicted, as the offset is estimated—(e.g., aggressive offset estimation can cause late termination or packet error, while conservative offset estimation can result in inefficient allocation of system resources.)

In a related embodiment, the delta and the number of sub-carriers ($W_{max}$) that are supportable at such delta can be employed to power up/down power transmission to maintain clear communication, and mitigate communication fade. For example, an access terminal (AT) can initially possess enough power to support 64 sub-carriers based on a delta of 5 db up from an associated control channel. Upon a 3 db fade, the control channel transmit power can be increased by 3 db, and the number of supported sub-carriers reduced to 32, at such new increased power channel-even though the delta does not change.

Additionally, for rate prediction the base station can measure the received pilot C/I, and apply an offset based on the predicted PSD traffic to pilot, and obtain the predicted data received C/I. The base station can then select a data rate based on a table look up from such predicted data received C/I. It is to be appreciated that the measured received pilot C/I can be filtered over time, particularly if the pilot is contained in a narrow band control channel and filtering over time is needed to obtain a wide band estimate.

In one embodiment, Start-time Fair Queuing (SFQ) algorithms can support arbitrary type of fairness metrics, as defined for the system. In a related aspect, such SFQ algorithms can also be modified to obtain latency and channel sensitive scheduling. The subject innovation extends the start time fair queuing approach, to achieve additional types of fairness, wherein the fixed weights w can be replaced with a generalized function h(ub), where ub is the mean data spectral efficiency for the user in bits/sec/Hz or bits/sec/subcarrier, with u being the instantaneous spectral efficiency. For example, if h(ub)=1, then start time fair queuing provides equal grade of service, and if h(ub)=ub, then start time fair queuing provides proportional fair queuing, where the service of each user is proportional to their channel condition. As such desired Cumulative Distributed Function (CDF) for throughput can be obtained, (e.g., assigning a percentage of users to receive a predetermined throughput) while maximizing spectral efficiency, subject to meeting throughput constraints.

According to one particular embodiment, rather than employing the arrival time of the packet at the access terminal (AT), the subject innovation employs arrival time of the request. In a related aspect of the subject innovation, resource allocation can be distributed based on at least one of: a top-down resource allocation (e.g., selecting a user with the smallest head of line, HOL, start time, and supplying such user the largest valid resource assignment available); a bottom-up resource allocation (e.g., selecting a user with the smallest HOL start time and supplies such user with the smallest resource assignment larger than what the user already has, followed by updating selecting the next user with the minimum HOL start time); and a middle-out resource allocation (e.g., where the scheduler takes the user with the minimum HOL start time and estimates the fair assignment size without regard to resource granularity or fragmentation for the selected user, and supplying the user with smallest resource greater than or equal to that granularity size if it exists, other wise the largest resource, and to move to the user with the next largest start time and iterate.)

According to a further aspect, a channel tree can be employed wherein Hop Ports (e.g., sub-carriers) with base nodes (e.g., 8 carriers, 16 carriers, and the like) can facilitate user assignments. It is to be appreciated that more than one user can also be assigned to a sub-carrier, wherein multiple antennas and spatial signatures are employed (e.g., similar in time, yet different in space.) Additionally, means for performing various activities/methods can be provided in form of software/hardware components, to execute aspects of the subject innovation.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 7b illustrates continuation of various acts for the methodology of FIG. 7a.

DETAILED DESCRIPTION

Figure 1:
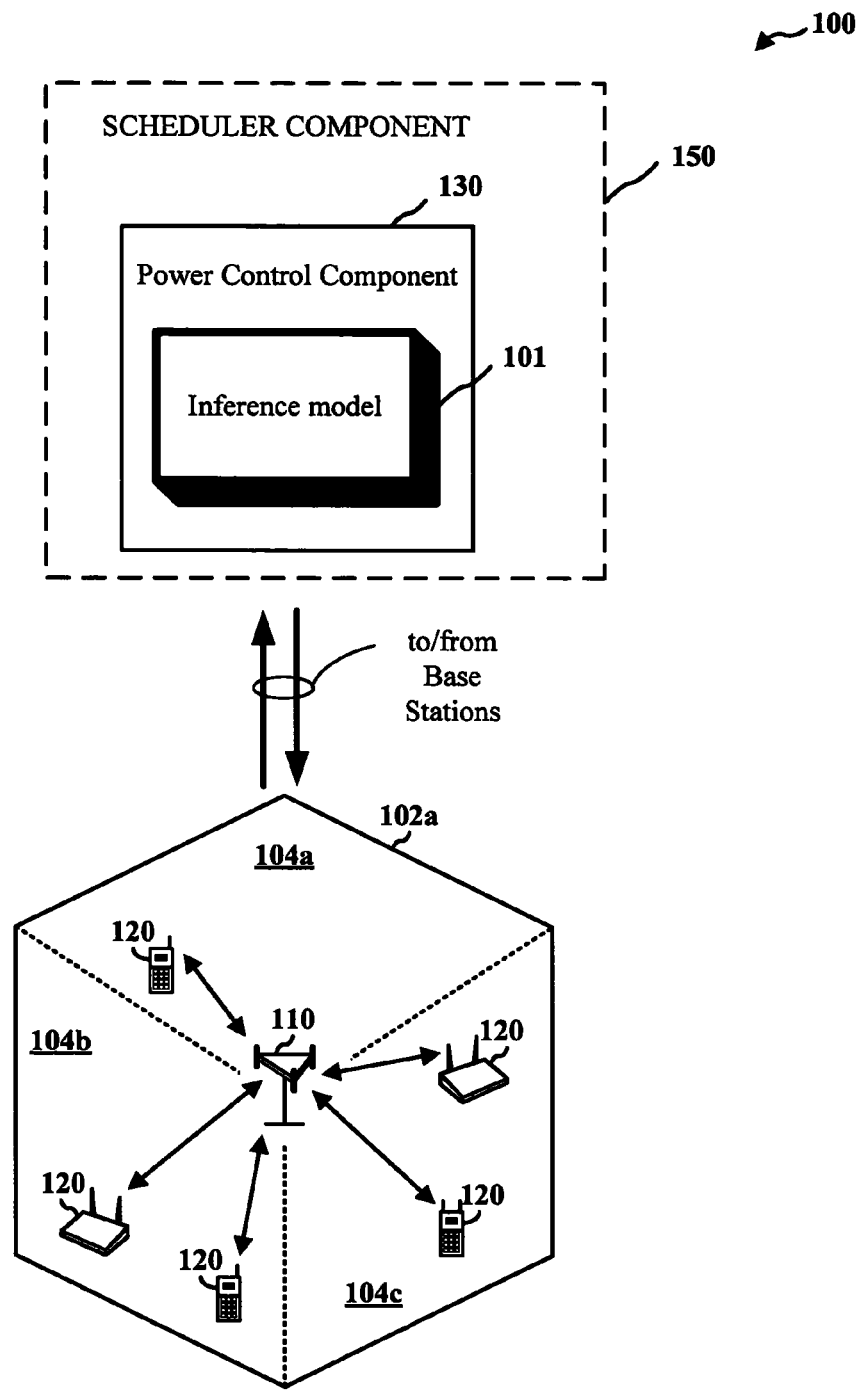
FIG. 1 illustrates a wireless communication system that employs a power control component with an inference model of expected power requirements, to facilitate scheduling users.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with a power control system 130 that employs a control algorithm to dynamically update a scheduling metric (e.g., adjusting transmission power for sub-carriers) based on a prediction function and/or inference model 101 of expected power requirements. The system 100 can include multiple base stations 110 and multiple terminals 120, which may be employed in conjunction with one or more aspects described herein. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas), namely; 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal can be fixed or mobile. A terminal can also be referred to as a mobile station, user equipment, a user device, or some other terminology. A terminal can be a wireless device, a cellular phone, a personal digital assistant (PDA), a wireless modem card, and so on. Each terminal 120 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a power control component 130 (that interacts with a scheduler component 150) and couples to base stations 110, to provide coordination and control for base stations 110. For a distributed architecture, base stations 110 can communicate with one another as needed. Reverse link data communication can occur from one access terminal to one or more access points. The power control component 130 can supply an efficient scheduling of users on the reverse link in an orthogonal manner, to optimally use system resources (e.g., not scheduling some users for particular sub-carriers), while simultaneously: maintaining a predetermined and/or arbitrary fairness metrics (e.g. every user sending same number of bits per second, every user having access to same number of resources, and the like), maintaining quality of service (QoS) and maximizing throughput. Moreover, associated overhead can also be regulated, to mitigate fragmentation and allow optimal system usage, during sub-carrier and packet format scheduling. For example, by taking advantage of sticky assignment, users can then be swapped in-and-out, while maintaining fairness, as described in detail infra. The number of assignments can be initially identified per unit of time, per frame, followed by taking out a user(s) and swapping in another user(s) instead, while maintaining the fairness, as defined for the system 100.

Figure 2:
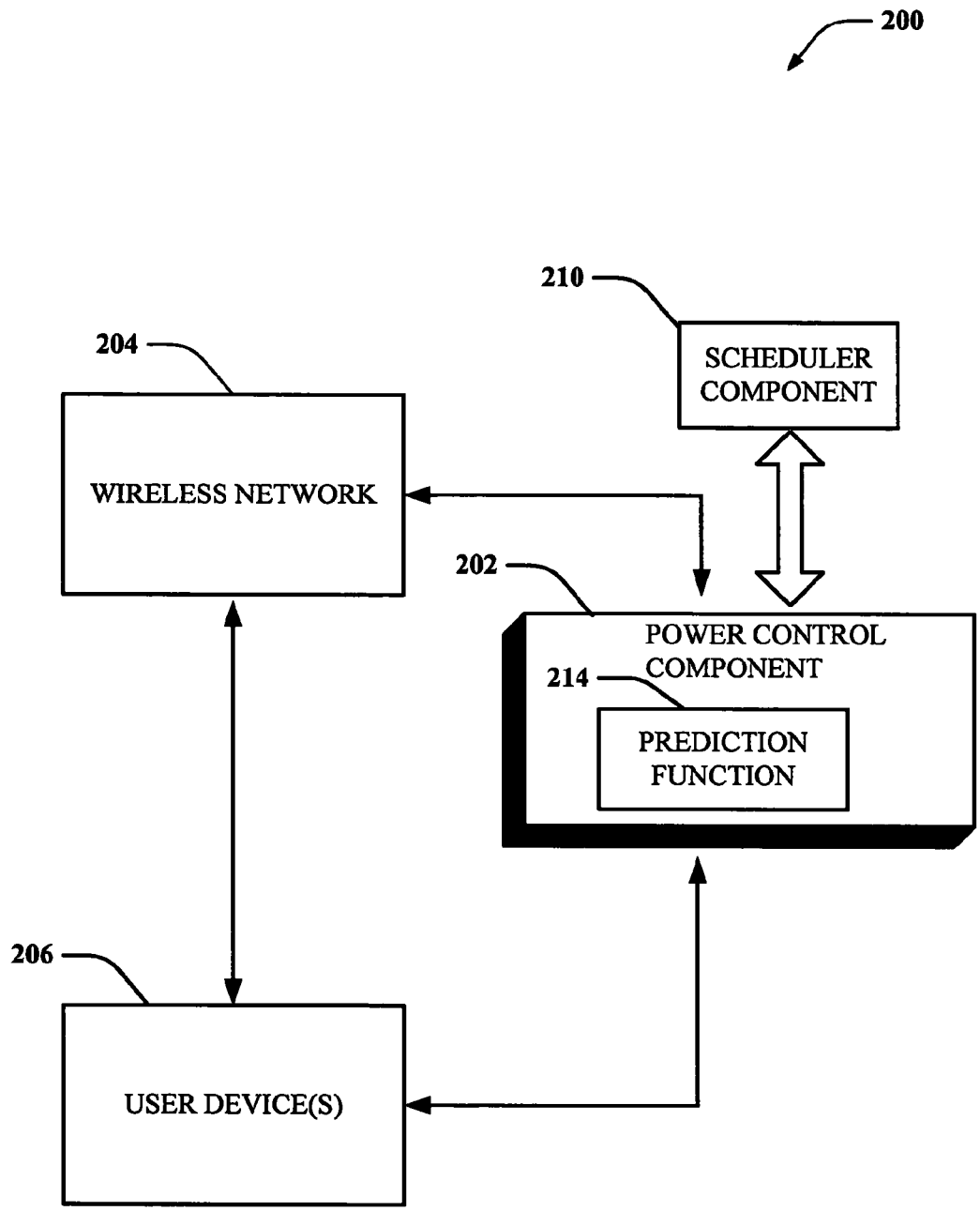
FIG. 2 illustrates a power control component that employs a prediction function in accordance with an aspect of the subject innovation.

FIG. 2 is an illustration of a system 200 that facilitates dynamically updating a scheduling metric, such as adjusting transmission power for sub-carriers based on a prediction function 214 of expected power requirements. The power control component 202 is operatively coupled to each of a wireless network 204 and user device(s) 206. Wireless network 204 can comprise on or more base stations, transceivers, and the like, which transmit and receive communication signals from one or more user devices 206. Additionally, wireless network 204 can provide communication service to user devices 206 in conjunction with an OFDM protocol, and OFDMA protocol, a CDMA protocol, a TDMA protocol, a combination thereof, or any other suitable wireless communication protocol. User devices 206 can be, for example, a cellular phone, a smartphone a PDA, a laptop, a wireless PC, or any other suitable communication device over which a user can communicate with the wireless network 204.

The scheduler component 210 can be a packet-based scheduler that can employ a fairness criteria. As such, the scheduler component 210 can determine a scheduling metric in a manner similar to that set forth above with regard to FIG. 1 in order to facilitate frequency set assignment to one or more user devices 206. Additionally, Start-time Fair Queuing (SFQ) algorithms associated with the scheduler component 210 can support arbitrary type of fairness metrics, as defined for the system. Such SFQ algorithms can also be modified to obtain latency and channel sensitive scheduling.

Typically, in start time fair queuing, the head of line (HOL) start time of each queue can be maintained; where the start time is the time at which the head of line packet can be sent in an idealized generalized processor scheduler or equivalently an idealized fluid fair scheduler that simultaneously serves users, similar to fluids flowing through a pipe. As such and on packet arrival, the packets can be marked with start and finish times. Start times $S(P_f^i)=\max\{v(A(P_f^i),F(P_f^{i-1})\}j>1$, $(P_f^i)$ are the max of the finishing time of the previous packet in the queue, or the current service time when the packet arrives. The finish time can be defined as $$F(P_f^j) = S(P_f^j) + \frac{l_f^j}{w_f} j \geq 1,$$

where S is the packet start time, l is the packet length, and w is the queue weight of the flow f. Additionally, the service time v(t) is equal to the start tag of the packet currently being served; wherein during idle times, v(t) is equal to the maximum finish tag of packets already served. Packets can be served in order of increasing start tags, and ties can be broken arbitrarily. Such start time fair queuing can provide a weighted equal grade of service fairness with weights w. The subject innovation extends the start time fair queuing approach, to achieve other types of fairness, wherein the fixed weights w can be replaced with a generalized function h(ub), where ub is the mean data spectral efficiency for the user in bits/sec/Hz or bits/sec/subcarrier, with u being the instantaneous. For example, if h(ub)=1, then start time fair queuing provides equal grade of service, and if h(ub)=ub, then start time fair queuing provides proportional fair queuing, where the service of each user is proportional to their channel condition. As such desired Cumulative Distributed Function (CDF) for throughput can be obtained, (e.g., assigning a percentage of users to receive a predetermined throughput) while maximizing spectral efficiency, subject to meeting throughput constraints.

Figure 3:
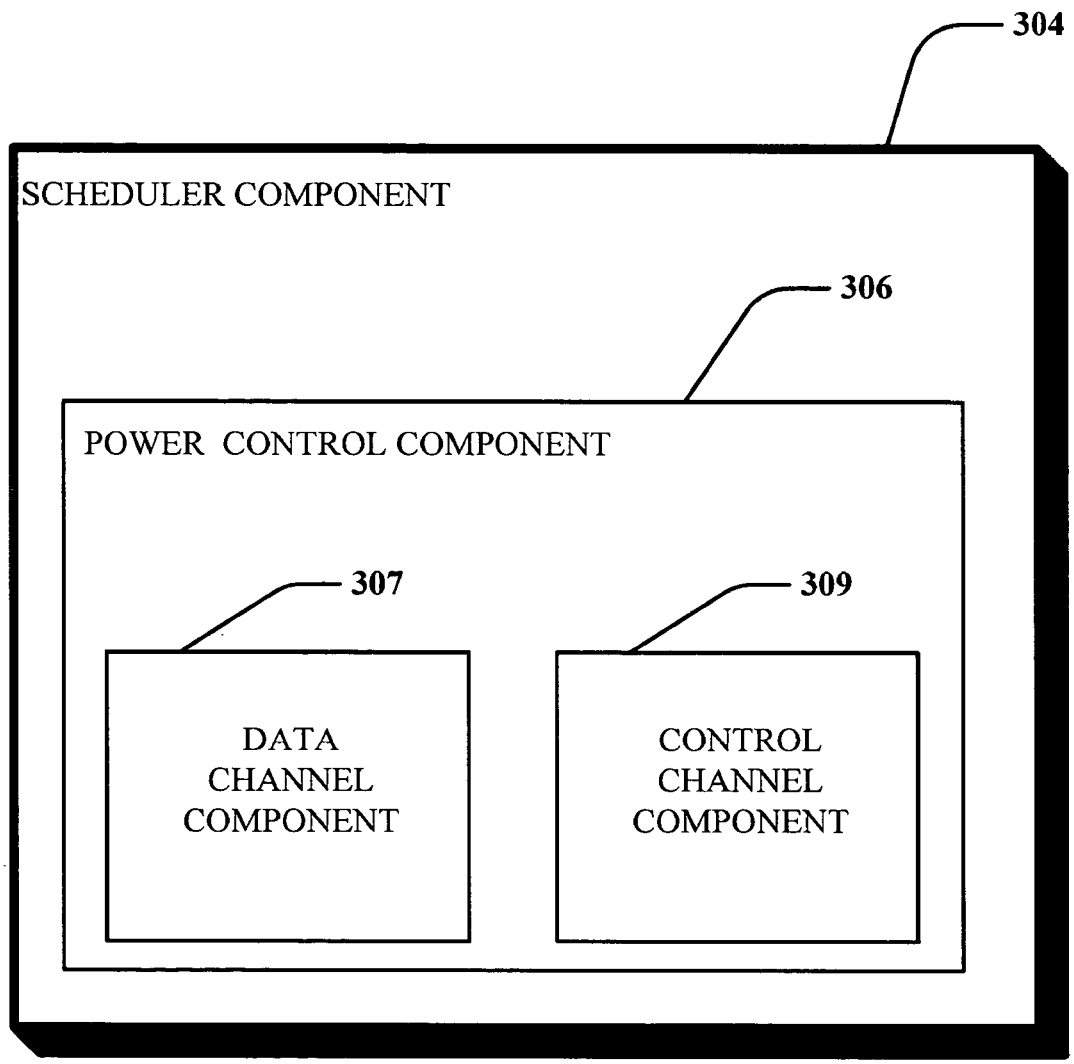
FIG. 3 illustrates a power control component prediction component that includes a data channel component and a control channel component.

FIG. 3 illustrates a further embodiment of the subject innovation, wherein a scheduler component 304 includes a power control component 306. The power control component 306 can include two further components, namely: the data channel component 307 and the control channel component 309. The control channel component 309 can be a power controller in form of a closed loop power controller (e.g., 85 Hz), wherein a carrier to interference ratio (C/I) information is being transmitted on such control channel and the power is adjusted to obtain performance requirements.

In one embodiment, a rate prediction that is associated with the power prediction component is a function of how much power is required to be transmitted. A power spectral density (PSD) that signifies amount of power per carrier can be employed, as an index of power transfer (instead of the actual power itself). For example, in the distributed power control algorithm, the access terminal can report the power spectral density per sub-carrier as an offset (delta) from the closed loop power controlled pilot (or an offset from a dedicated control channel transmit power level, wherein the control channel can be closed loop power controlled to a given level of performance.)

Accordingly, the data channel can be sent at an offset from the power use for control channel, and upon determining such offset, the PSD that a user supports can also be determined. By examining behavior of assigning base stations, transmit power can then be predicted, as the offset is estimated—(e.g., aggressive offset estimation can cause late termination or packet error, while conservative offset estimation can result in inefficient allocation of system resources.)

Figure 4:
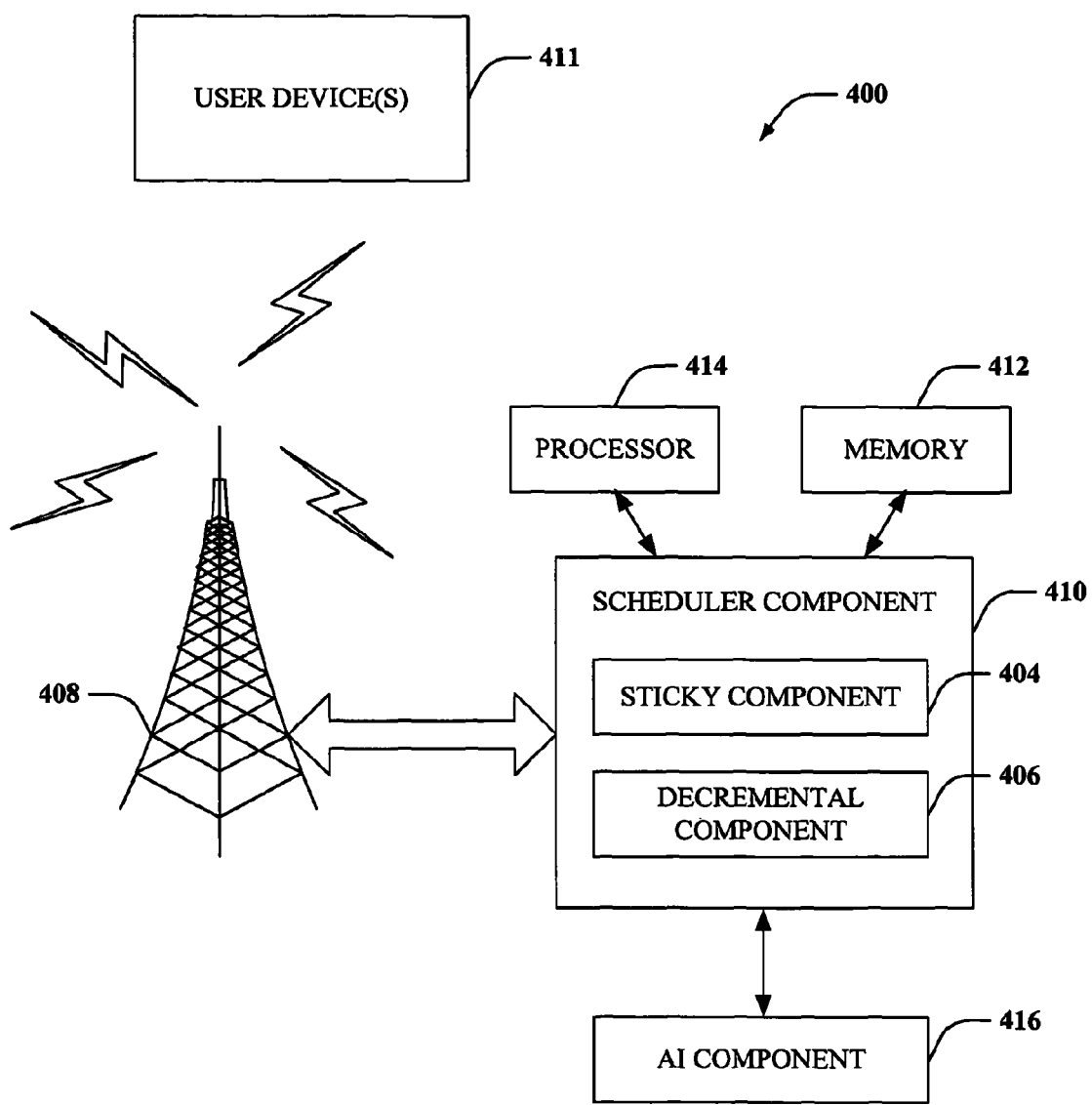
FIG. 4 illustrates a system arrangement for rate prediction, in accordance with an aspect of the subject innovation.

FIG. 4 illustrates a system 400 that facilitates scheduling via employing a power control algorithm on a reverse link in an orthogonal manner. The system 400 can optimally use system resources (e.g., not scheduling some users for particular sub-carriers), while simultaneously: maintaining a predetermined and/or arbitrary fairness metrics (e.g. every user sending same number of bits per second, every user having access to same number of resources, and the like), maintaining quality of service (QoS) and maximizing throughput. The system 400 includes a scheduler component 410 that is operatively coupled to a wireless network 408 and one or more user devices 411. The system 400 regulates associated over head and mitigates fragmentation, to allow optimal system usage during sub-carrier and packet format scheduling. The sticky component 404 can assign sticky assignments; wherein users can then be swapped in-and-out, while at the same time the system 400 maintains its fairness criteria. The number of assignments can be initially identified per unit of time, per frame, followed by taking out a user(s) and swapping in another user(s) instead, while maintaining the fairness, as defined for the system.

System 400 can further comprise a memory 412 and a processor 414 (operatively connected to the scheduler component 410), and which store or process information related to channel desirability algorithms, metrics, available frequency sets, user device frequency assignment, and the like. The processor 414 can be operatively connected to the scheduler component 410 (and/or memory 412) to facilitate analysis of information related to fairness criteria, desirability metrics, frequency reuse, and the like—so that based on a prediction function and/or inference model of expected power requirements, then the transmission power is being updated. It is to be appreciated that processor 414 can be any of: a processor dedicated to analyzing and/or generating information received by the scheduler component 410, a processor that controls one or more components of system 400, and a processor that both analyzes and generates information received by the scheduler component 410 and controls one or more components of system 400. Memory 412 can additionally store protocols associated with generating frequency assignments, metrics, and the like—such that system 400 can adjust transmission powers or update another scheduling metric via a power control algorithm. Moreover, it is to be appreciated be appreciated that the data store (e.g., memories) components described herein can be either volatile memory or nonvolatile memory, or can include both volatile and nonvolatile memory.

For example, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

As illustrated in FIG. 4, an AI component 416 can be operatively associated with the scheduler component 410 and can make inferences regarding adjusting transmission power for sub-carriers based on a prediction function and/or inference model. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, the AI component 416 can infer an appropriate decremental assignment recipient based at least in part on, for instance, detected conflicting assignments. According to this example, it can be determined that a first user requires three additional system resource blocks, such as transmission channels and the like. AI component 416, in conjunction with processor 414 and/or memory 412, can determine that such resource blocks are limited and/or occupied by other users. AI component 416 can make inferences regarding a cost-benefit analysis with regard to, for example, selection of a particular user device deassignment candidate from a group of potential candidates. For instance, second and third users can both have resource assignments suitable for reassignment to user 1, but the third user requires substantially more power to receive messages (e.g., due to a larger distance from a base station 408, poorer quality of the receiving device, . . . ). In such a case, AI component 416 can facilitate selection of the second user because transmission costs are cheaper and the second user possesses a suitable resource assignment. Based at least in part on such inferences, a decremental component 406 can identify the second user as the user to be decremented and can ensure that the conflicting assignment to the first user device is viewable by the second user device. Upon notification of the conflicting assignment to the first user device, the second user device can automatically have its assignment list decremented accordingly.

In a related aspect, the AI component 416 can supply an inference based on the delta and the number of sub-carriers ($W_{max}$) that are supportable at such delta, to power up/down power transmission to maintain clear communication, and mitigate communication fade. For example, an access terminal (AT) can initially possess enough power to support 64 sub-carriers based on a delta of 5 db up from an associated control channel. Upon a 3 db fade, the control channel transmit power can be increased by 3 db, and the number of supported sub-carriers reduced to 32 at such new increased power channel-even though the delta does not change.

According to another example, AI component 416 can make inferences regarding whether or not to completely de-assign a conflicting user's assignments upon transmission of a conflicting assignment message to another user. For instance, a threshold percentage of assignment conflict can be defined and employed as a benchmark by which to test conflicting assignments. If a first user is assigned five transmission channels and a second user is issued an assignment message that conflicts with three of the first user's assigned transmission channels, AI component 416 can infer that complete deassignment of the first user's resources is preferential to decremental assignment. Such can facilitate making resources available when resource allocation has reached a saturation point. The conflict threshold percentage can be predefined and or can be redefined during network operation as resource availability dictates.

Figure 5:
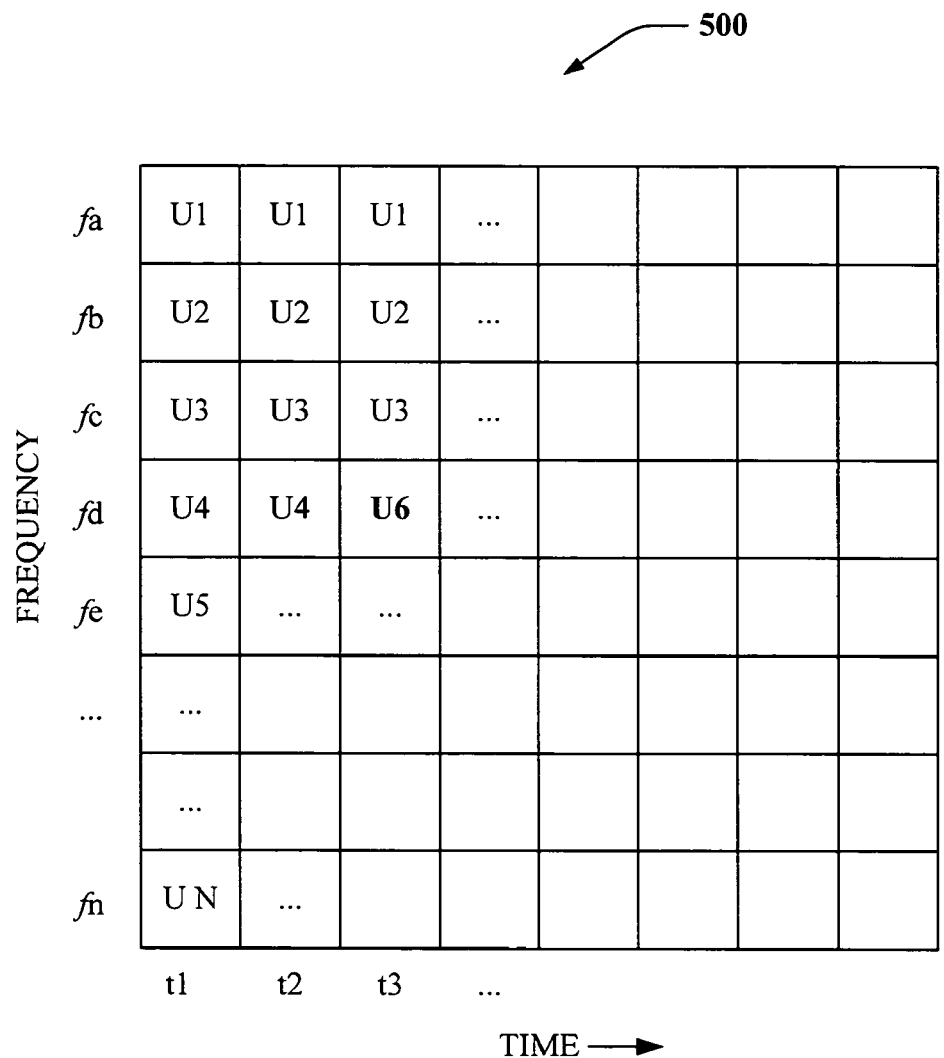
FIG. 5 illustrates a methodology for a series of persistent, or "sticky" assignments made over time, such as can be employed with regard to various embodiments described herein.

FIG. 5 is an illustration of a series of persistent, or "sticky" assignments 500 made over time, such as can be employed with regard to various embodiments described herein. For example, a first set of assignments can be transmitted to users 1-N (where N is an integer) during a first time frame, and such assignments can persist until one or more subsequent assignments are transmitted to one or more individual users. Thus, the first set of N assignments can suffice to provide system resource assignments to all users until a change in such assignments is desired and/or necessary (e.g., due to a change of prediction for expected power requirements of sub-carriers.) A subsequent user such as U6 can be assigned frequency D should such frequency become available, as illustrated at t3. Accordingly, fewer assignment messages need be transmitted over a network than when employing non-sticky assignments.

Additionally, available system resources can be assigned to any user 1-N should the user require additional resources. For instance, it can be determined that U5 requires additional frequency availability at some time during communication over a network, in addition to frequency E. A subsequent assignment message can be transmitted to U5 to indicate that frequencies E and F are assigned U5. Moreover, in connection with the various embodiments detailed herein, such additional assignment message can be a supplemental assignment to mitigate consumption of network resources when reassigning frequencies to U5. As explained earlier, users can then be swapped in-and-out while maintaining fairness. The number of assignments can be initially identified per unit of time, per frame, followed by taking out a user(s) and swapping in another user(s) instead, while maintaining the fairness, as defined for the system.

In a related aspect, proportional fairness in an OFDMA system can be achieved by computing the finishing time F as $$F = S + N \times T,$$

wherein N is the number of subcarriers assigned to the user and T is the time assigned to the user to transmit the data. In a related aspect, the subject innovation employs modified start times—rather than start times for scheduling users. Accordingly, modified start time can be defined as:

$$S_m = (S-a) \times \exp(-b \times W) \times (ub/u)^c$$

wherein, $S_m$ is the modified start time, "a" is a lag term that offsets the modified start time, "b" is a weighting factor, W is the time that the head of line packet has been waiting, "ub" is the user's mean spectral efficiency, "u" is the users instantaneous spectral efficiency, and the exponent "c" is another weighting factor. Such modified start time allows for channel-sensitive scheduling and latency-sensitive scheduling. In addition, the $(ub/u)^c$ term decreases the start time if the instantaneous channel condition is better than the average channel condition, and the $\exp(-b \times W)$ term decreases the start time as the waiting time of the head of line packet increases.

Figure 6:
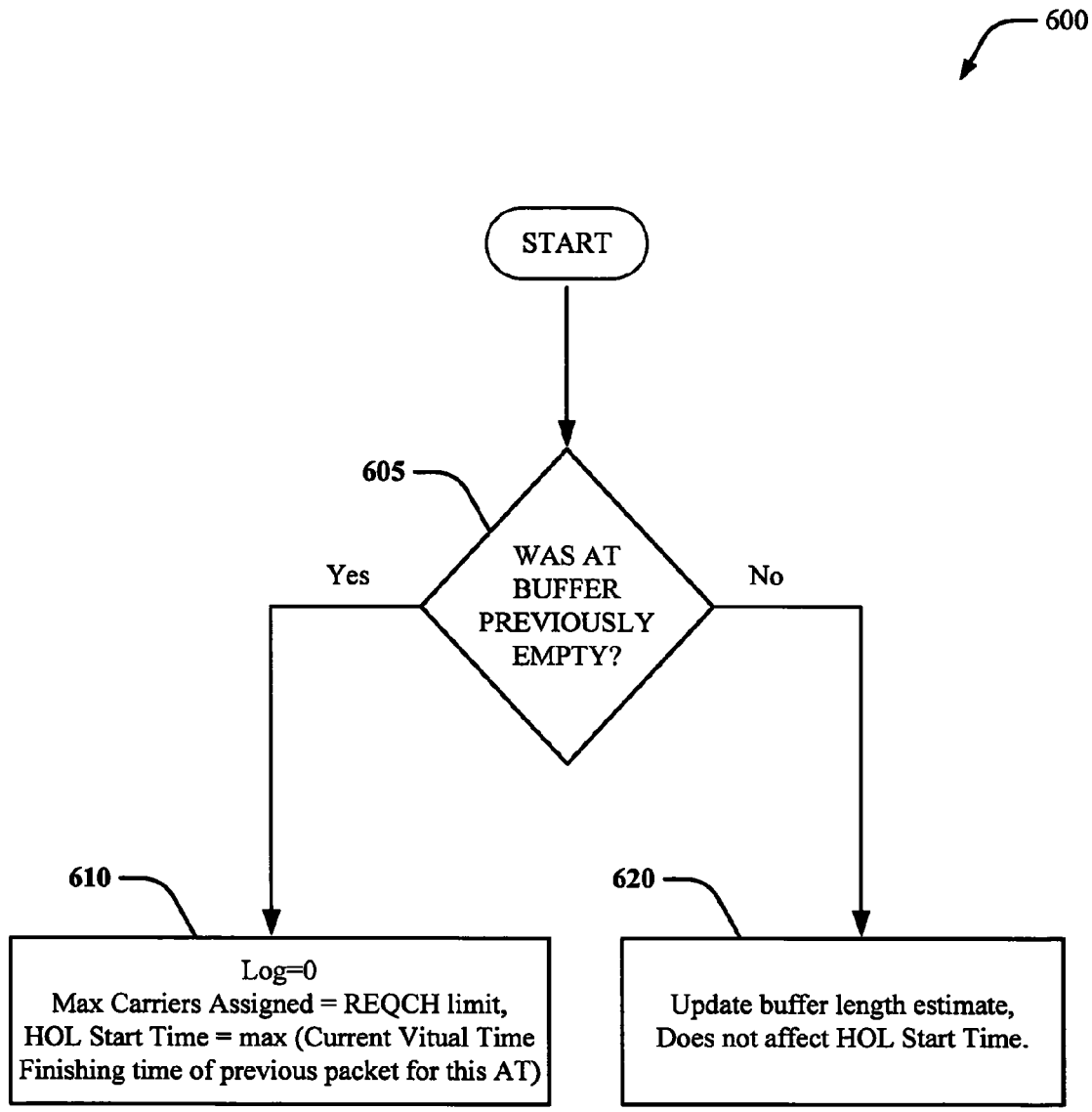
FIG. 6 illustrates a methodology for a scheduler's response to the reception of the request message, according to a particular aspect of the subject innovation.

Subsequently, the centralized scheduler can obtain the scheduling data from the access terminals. The course information can be sent in a dedicated out-of-band request channel. The request can include a course quantization of the buffer level for the amount of data to be sent, a maximum number of subcarriers that the AT can currently support based on power control. FIG. 6 illustrates a scheduler's response to the reception of the request message, according to a methodology 600. As such, the head of line start time is obtained when the request arrives. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. A determination is performed whether AT buffer was previously empty at 605. Subsequently, and if the AT buffer was previously empty, the methodology proceeds to act 610, wherein the maximum number of carriers that can be assigned, and the HOL start time(s) are determined. Otherwise, and if the AT buffer was not previously empty, the methodology 600 proceeds to act 620, wherein buffer length estimate is updated.

Figure 7A:
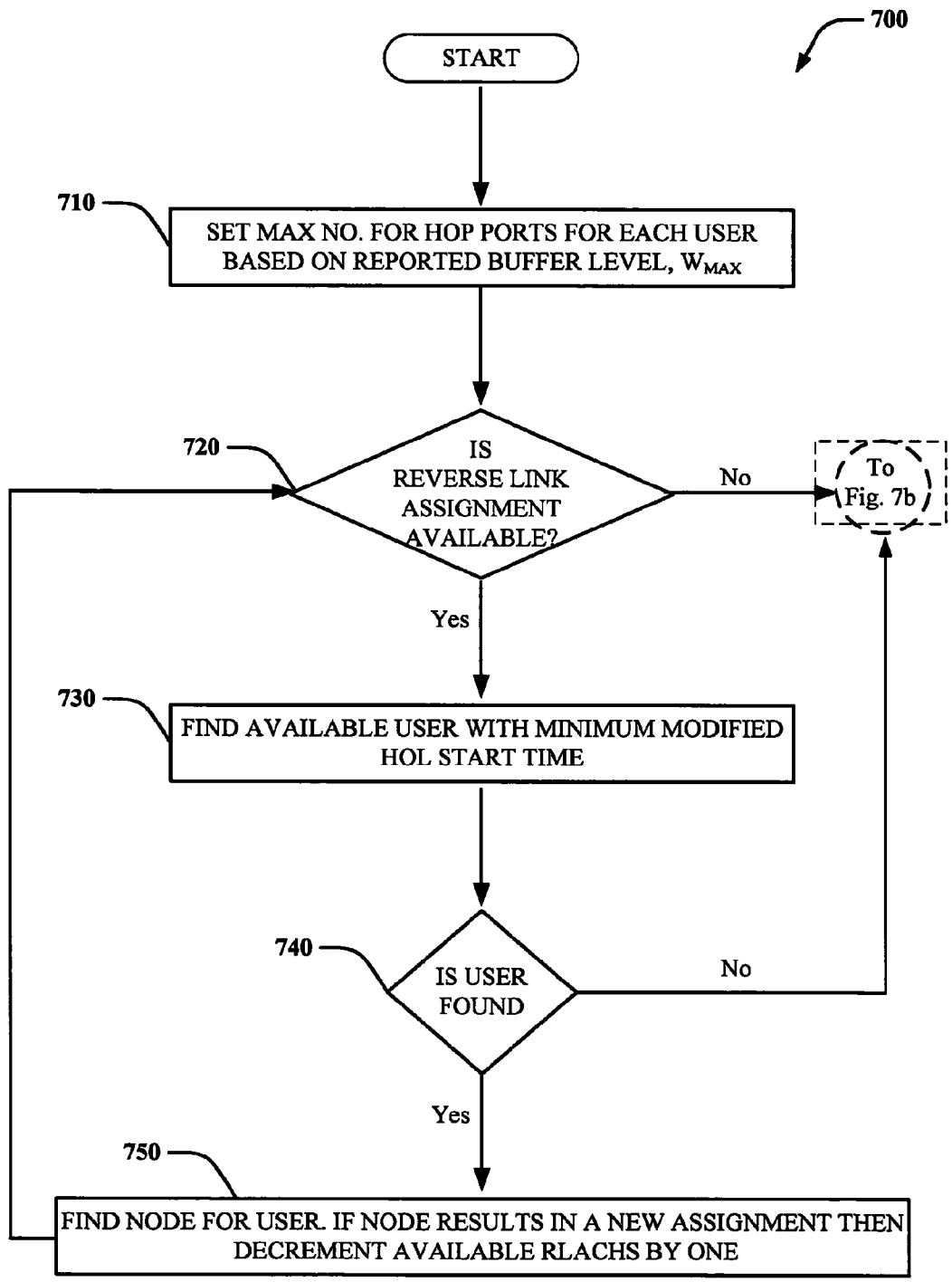
FIG. 7a illustrates an exemplary method to allocate resources for the scheduler, in accordance with an aspect of the subject innovation.

Referring now to FIG. 7a there is illustrated an exemplary method to allocate resources for the scheduler, in accordance with an embodiment of the subject innovation. The methodology 700 illustrates a run for each scheduling interval, such as at the beginning of each frame. Such can facilitate scheduling multiple users to different resources for the next frame. Initially and at 710, the access point (AP) (also referred to as the base-station-BTS), sets the maximum number of hop ports for each user. Such can depend on: the reported buffer levels, the reported maximum number of subcarriers that the user can support based on max power constraints, and the power control data transmit power spectral density in power per subcarrier. Moreover, the maximum number of subcarriers can be computed in several ways. For example, one way is to compute the data spectral density in bits per subcarrier based on the received power spectral density, and subsequently divide the buffer by the data spectral density to obtain the number of subcarriers worth of data to send, followed by a comparison with the number of subcarriers supported based on the max power constraint, and then chooses the minimum of the two.

Next and at 720, the scheduler can determine whether there are currently resources available, to send an additional reverse link channel assignment. If so, and at 730 the scheduler determines the user with the minimum modified head of line start time among users available for scheduling. It is possible that a user may not be available for a number of reasons, including that the user does not have data to send, or that the user already has an assignment and is in the process of sending data, such as a hybrid automatic repeat request (HARQ) set of transmissions, and the like—thus a determination is made at 740. If a user is found, then the methodology 700 proceeds to 750, wherein the user is given a resource assignment.

Figure 7B:
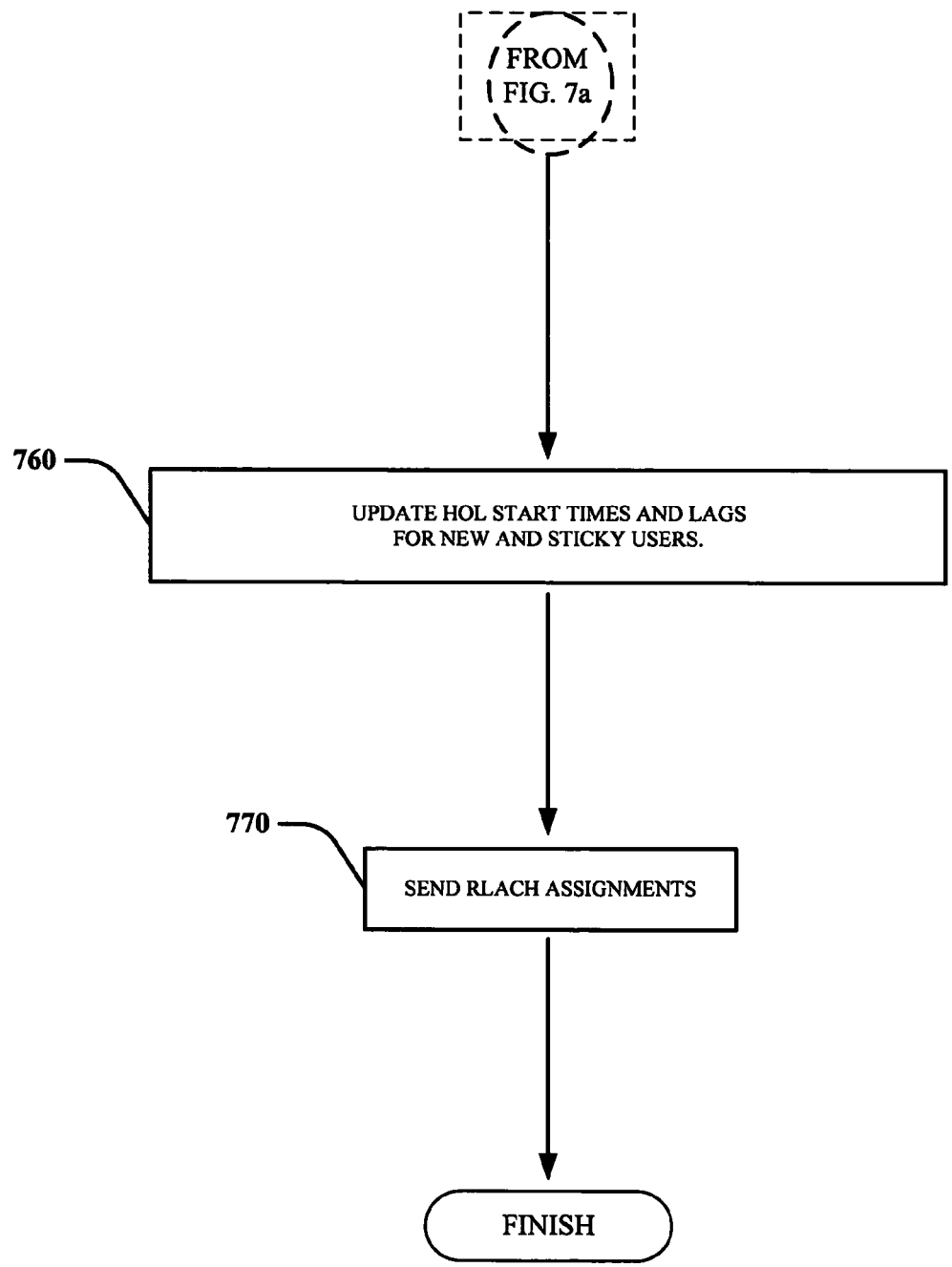

The resource can be determined in a number of ways, and is described in detail with reference to FIG. 8, infra. The scheduler can then mark the resource as used, and if appropriate, decrements the number of reverse link assignments, at 750. There can exist instances that it would not be appropriate to include whether the same user from a previous iteration of the flow chart is being given a different assignment, yet the assignment transmission overhead for the user has already been accounted for. Such process can be repeated until there are no more users, assignments, or resources to schedule. At that point, the head of line start times (HOL) and the virtual time are updated at 760, of FIG. 7b and the actual assignment messages are sent at 770, as illustrated in FIG. 7b.

Figure 8:
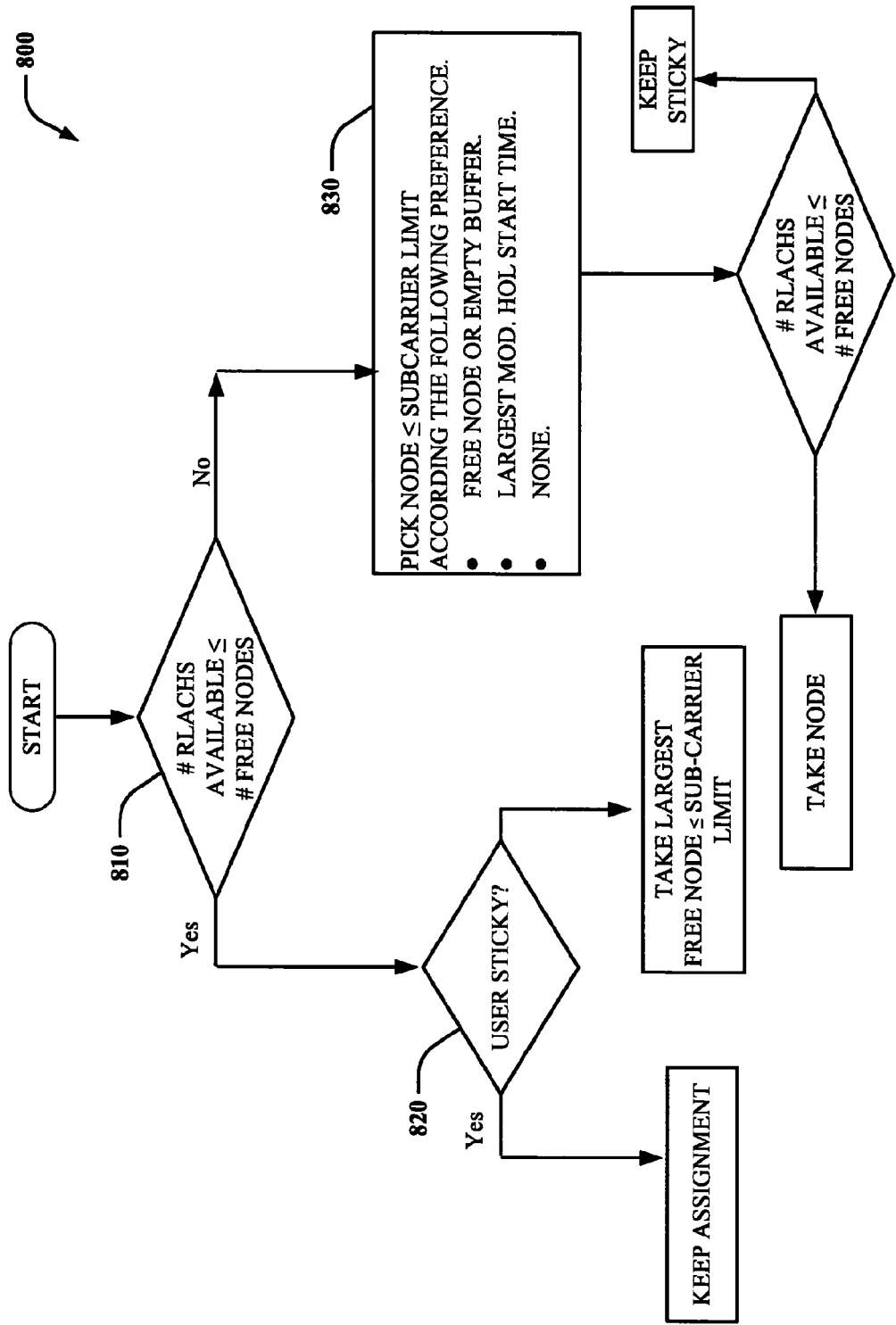
FIG. 8 illustrates a methodology that determines which resource to schedule to a selected user with the minimum start time, in accordance with an aspect of the subject innovation.

FIG. 8 illustrates a methodology that determines which resource to schedule to a selected user with the minimum start time. As illustrated, the methodology 800 takes into account the limited number of assignments, and employs the availability of sticky assignments—(as explained earlier a sticky assignment is an assignment that persists until the resource is explicitly taken from the user through either an explicit assignment of the resource to another user, or the de-assignment of the resource from the user.) Such process also attempts to keep typically all of the resources utilized, where the method of resource assignment can create problems, such as fragmentation of subcarriers if a user must be assigned consecutive subcarriers, or if there are other resource assignment constraints.

Initially and at 810, a determination is performed to verify if there exists a risk of not being able to assign typically all of the resources based on the number of unassigned resources and the number of assignments available. Accordingly, if fragmentation is a risk, then the scheduler attempts to supply resources to non-sticky users at 820. Otherwise, and at 830 the user is assigned first, if possible to an unassigned resource, next to a resource that was otherwise assigned to a user with an empty buffer, then next to the resource used by the user with the largest modified head of line start time, and finally to no resource.

Figure 9:
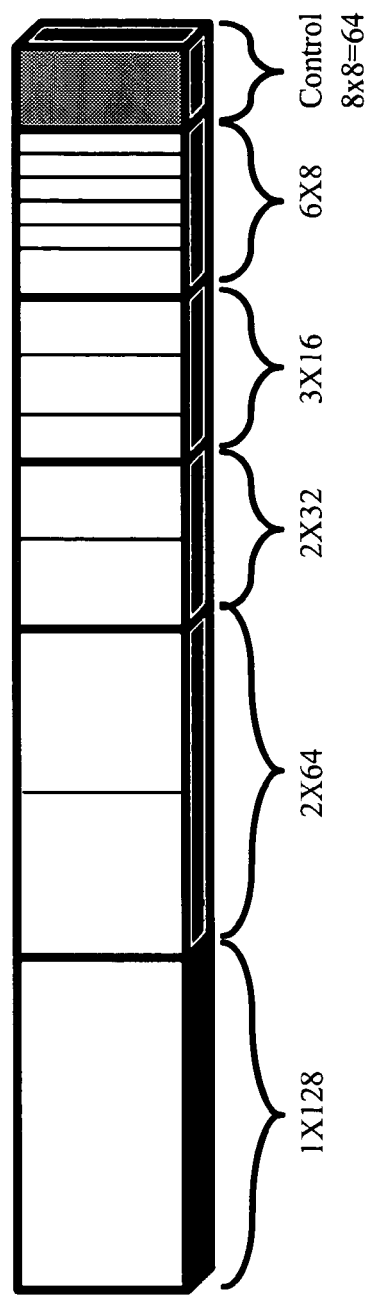
FIG. 9 illustrates pre-allocation of hop ports according to a particular embodiment of the subject innovation.

FIG. 9 illustrates a pre-allocation of hop ports 900 in accordance with an aspect of the subject innovation. Typically, a method to avoid fragmentation in accordance with a particular aspect of the subject innovation is to pre-allocate set of resources (subcarriers, hop ports, codes, and the like), and then swap users in an out of the resources. The number of chunks of resources pre-allocated can be adaptive based on the number of users and types of users. The types of users can include: associated channel qualities, maximum number of supportable sub-carriers, traffic qualities, and the like. As illustrated, FIG. 9 shows a possible pre-allocation of hop ports for 16 users with different channel and traffic characteristics, in accordance with an aspect of the subject innovation.

In related aspects, resources can be chosen more dynamically to include top-down and bottom-up resource allocations, for example. In the top down resource allocation, the user with the smallest head of line start time is selected, and then provided with the largest valid resource assignment. Subsequently, the next smallest HOL start time is selected, and provided with the largest valid resource assignment. Such methodology can be continued, so to complete the resource allocation.

Likewise, the bottom-up allocation can select the user with the smallest HOL start time, and provide such user the smallest resource assignment that is larger than what the user already has. Subsequently, such user's HOL start time can be updated, followed by selection of the next user with the minimum HOL start time. Such allocation, then selects the next user with the minimum HOL start time, which may be the same user as previously. The user can be supplied with the smallest resource assignment greater than its current assignment, followed by an update the HOL start time based on the new assignment.

In general, the bottom up method can provide shorter term fairness, while the top down method provides less resource fragmentation. In a related embodiment, a middle out resource allocation can also be employed, wherein the scheduler takes the user with the minimum HOL start time and estimates the fair assignment size regardless of resource granularity or fragmentation for the selected user. The user can then be supplied with the smallest resource greater than or equal to that granularity size, should it exists. Other wise the largest resource can be supplied, and to the user moved with the next largest start time, followed by similar iterations.

Figure 10:
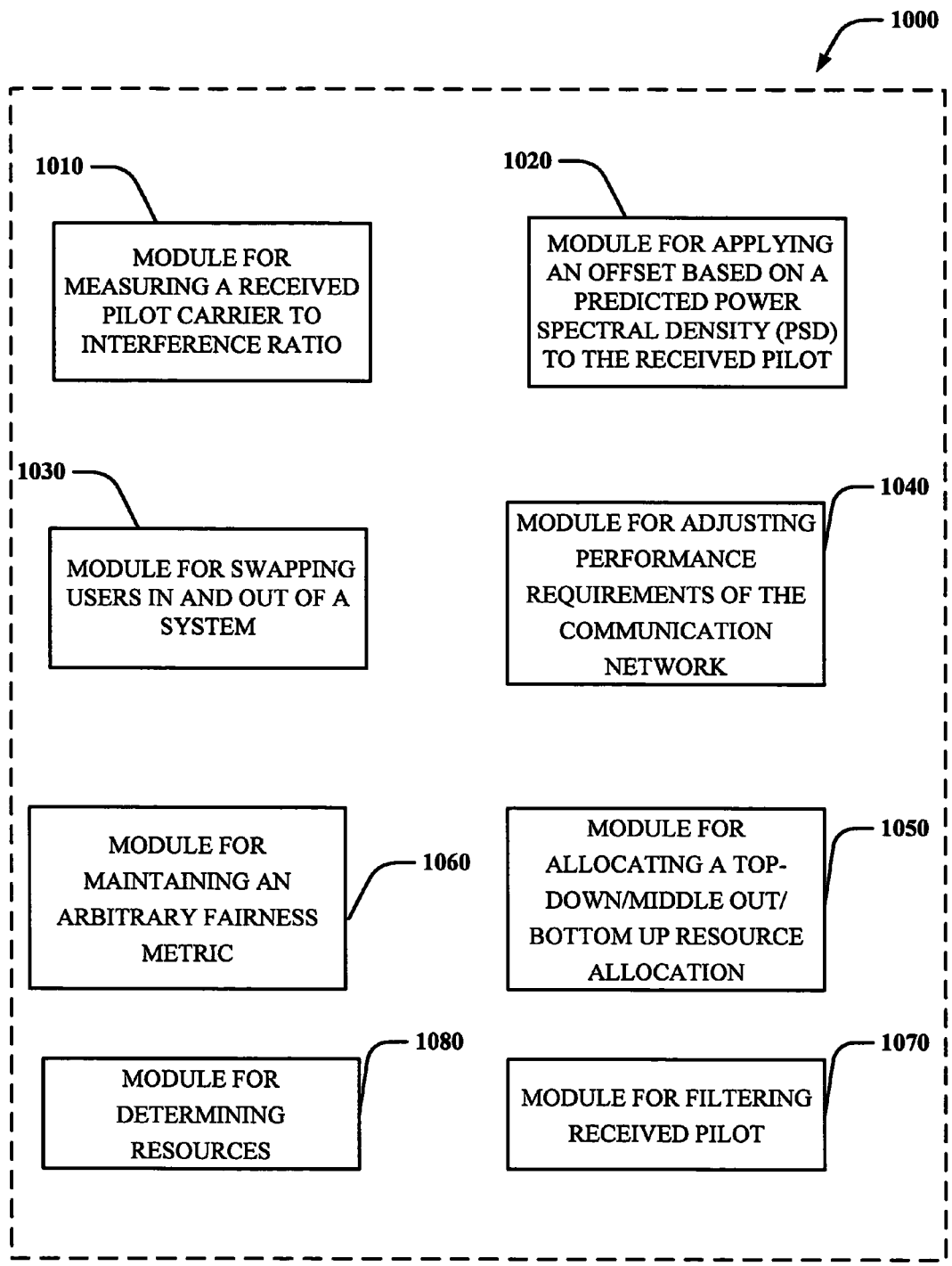
FIG. 10 illustrates an apparatus that employs a plurality of modules for performing various aspects of the subject innovation.

FIG. 10 is an apparatus that incorporates a plurality of modules to implement various aspects of the subject innovation. The term module can refer to a computer-related entity, either hardware, a combination of hardware and software, software, or software in execution, as well as an electromechanical component. For example, a module can be, but is not limited to, a process running on a processor, a processor, an object, an executable, a thread of execution, a program, and a computer. By way of illustration, an application running on a server and/or the server can be a module. In addition, a module can include one or more subcomponents. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The apparatus 1000 includes a module 1010 that is for measuring a received pilot carrier to interference ratio (C/I). Likewise, the module 1020 can be employed for applying an offset based on a predicted power spectral density to the received pilot. In addition, a module 1030 is employed for swapping users in and out of the communication network according to one aspect of the subject innovation. In addition, the module 1040 is employed for adjusting performance requirements for the communication network, based on a fairness criteria in accordance with an aspect of the subject innovation.

Moreover, the module 1050 can distribute and allocate resources based on at least one of: a top-down resource allocation (e.g., selecting a user with the smallest head of line, HOL, start time, and supplying such user the largest valid resource assignment available); a bottom-up resource allocation (e.g., selecting a user with the smallest HOL start time and supplies such user with the smallest resource assignment larger than what the user already has, followed by updating selecting the next user with the minimum HOL start time); and a middle-out resource allocation (e.g., where the scheduler takes the user with the minimum HOL start time and estimates the fair assignment size without regard to resource granularity or fragmentation for the selected user, and supplying the user with smallest resource greater than or equal to that granularity size if it exists, other wise the largest resource, and to move to the user with the next largest start time and iterate.) Also, module 1060 is employed for maintaining an arbitrary fairness metric, as described in detail supra. It is to be appreciated that the measured received pilot C/I can be filtered over time via module 1070, particularly if the pilot is contained in a narrow band control channel and filtering over time is needed to obtain a wide band estimate. In addition, module 1080 can determine available resources for scheduling the users.

Figure 11:
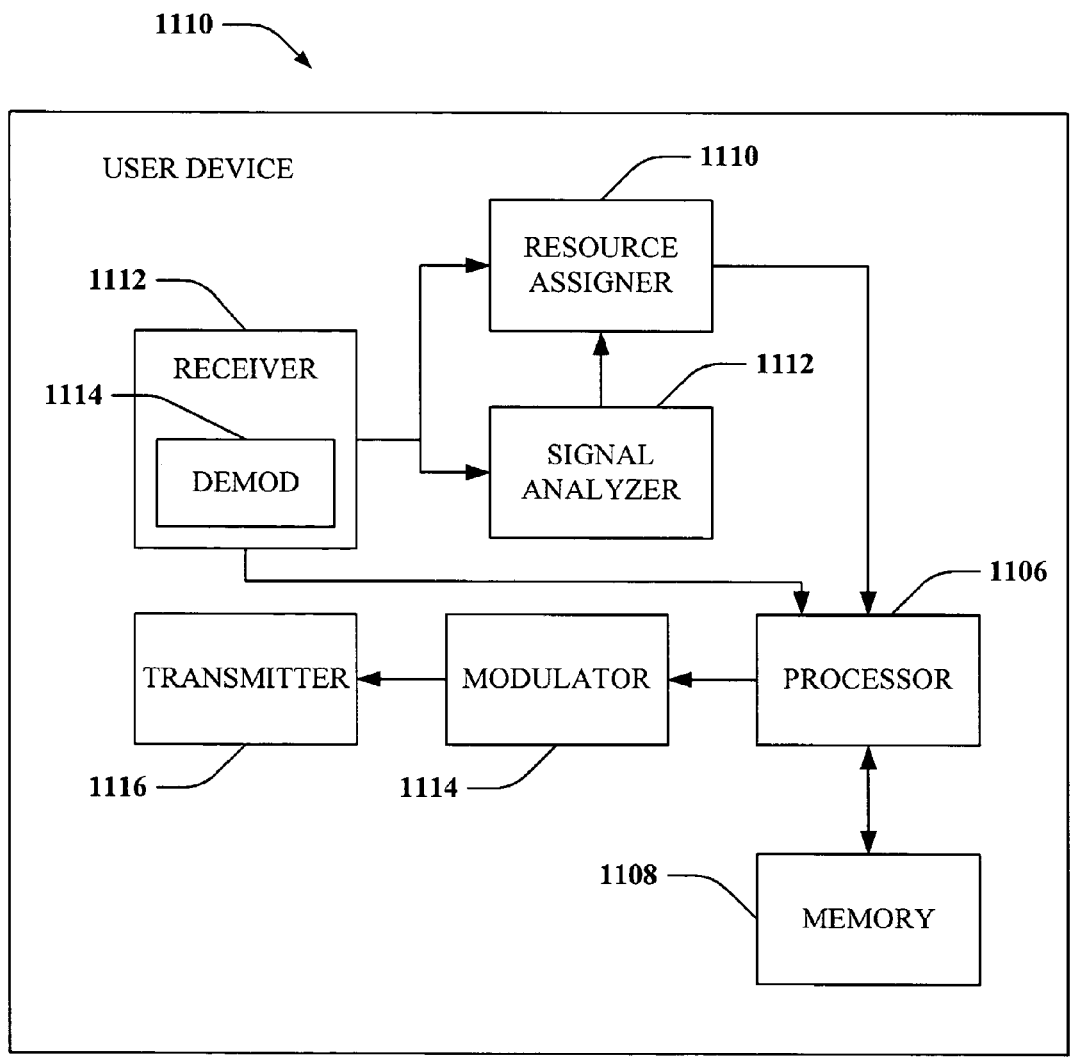
FIG. 11 illustrates a user device that facilitates estimating a channel and/or predicting a rate to be utilized in connection with a scheduling based on an inference of expected power requirements.

FIG. 11 is an illustration of a user device 1100 that facilitates estimating a channel and/or predicting a rate to be utilized in connection with a time varying channel with time varying interference. User device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of user device 1100, and/or a processor that both analyzes information received by receiver 1102, generates information for transmission by transmitter 1116, and controls one or more components of user device 1100.

User device 1100 can additionally comprise memory 1108 that is operatively coupled to processor 1106 and that may store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a resource assigner 1110 that allocates resources in response to obtaining data (e.g., a request, a pilot, etc.). For instance, receiver 1102 may receive a request and provide the request and/or information associated with the request to resource assigner 1110. In response to the request and/or information associated with the request, resource assigner 1110 may identify resources to be utilized (by a disparate node) in connection with future data transmissions. By way of illustration, the assigned resources may be a channel, a power, and the like.

Additionally, a signal analyzer 1112 may evaluate a pilot obtained via receiver 1102 as well as any interference. The signal analyzer 1112 may determine the strength of the pilot, the strength of the interference, and the like. Further, signal analyzer 1112 may estimate a signal to interference noise ratio (SINR) associated with a received transmission (e.g., pilot). Resource assigner 1110 may utilize the SINR to assign a rate (e.g., coding format, modulation format, etc.) to be utilized for the future transmission. User device 1100 still further comprises a modulator 1114 and a transmitter 1116 that transmits the signal to, for instance, an access point, another user device, etc. Although depicted as being separate from the processor 1106, it is to be appreciated that resource assigner 1110, signal analyzer 1112 and/or modulator 1114 may be part of processor 1106 or a number of processors (not shown).

Figure 12:
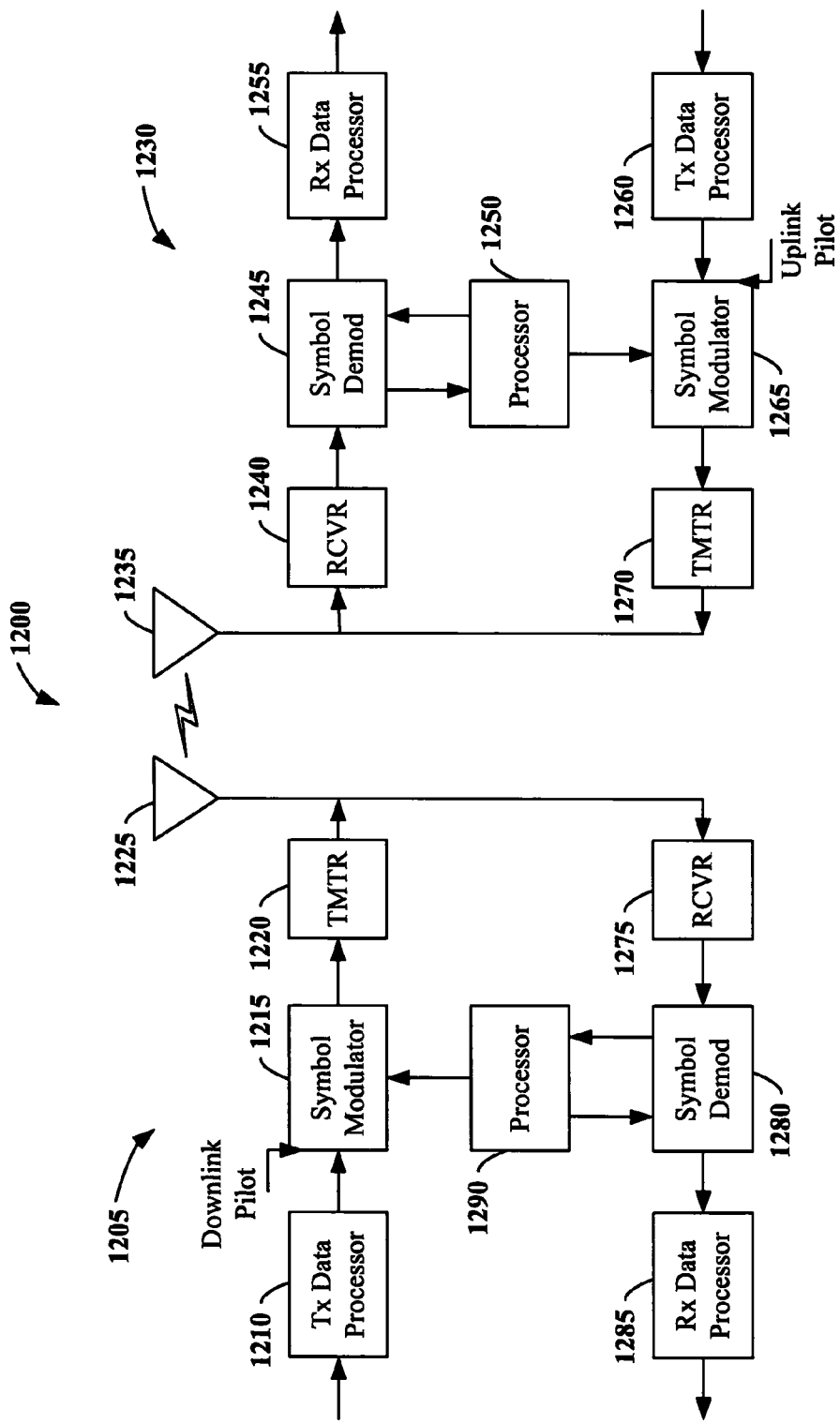
FIG. 12 illustrates an exemplary wireless communication system, which can employ inference of power requirements in accordance with an aspect of the subject innovation.

FIG. 12 shows an exemplary wireless communication system 1200. The wireless communication system 1200 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the systems and/or methods described herein to facilitate wireless communication there between. As illustrated in FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), de-interleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of scheduling users in a wireless communication network comprising:
   receiving signals from access terminals, wherein the received signals indicate power spectral density per subcarrier reported by an access terminal as an offset from a control channel transmit power level;
   predicting expected power requirements for subsequent transmissions by the access terminals on subcarriers of a frequency division multiplexed reverse link based on the received signals; and
   assigning frequency sets of the subcarriers to the access terminals based on the predicted expected power requirements, wherein predicting the expected power requirements comprises:
     determining a second offset from the control channel transmit power level; and
     determining a power spectral density that is supportable by at least one of the access terminals for data channel transmissions based on the second offset.

2. The method of claim 1 wherein the assignment of the frequency sets comprises defining a sticky assignment by preassigning a subcarrier to one of the access terminals, wherein the preassigned subcarrier remains assigned to the one of the access terminals during subsequent subcarrier assignments until another one of the access terminals is swapped into the preassigned subcarrier.

3. The method of claim 1 wherein the assignment of the frequency sets comprises employing a fairness criteria for the wireless communication network, wherein start times for scheduling the access terminals are weighted such that service for the access terminals is proportional to channel conditions for the access terminals.

4. The method of claim 1, wherein the assignment of the frequency sets comprises determining a quantity of the subcarriers that are supportable for the data channel transmissions based on the determined supportable power spectral density.

5. The method of claim 1 wherein the assignment of the frequency sets comprises changing assignments of the subcarriers to the access terminals as a result of a change in the predicted expected power requirements for the subcarriers.

6. The method of claim 1 wherein the assignment of the frequency sets comprises:
   computing data spectral density in bits per subcarrier based on the received signals, wherein the received signals indicate transmit power spectral density per subcarrier reported by the access terminals; and
   determining a quantity of subcarriers for sending data based on buffer levels reported by the access terminals and the computed data spectral density in bits per subcarrier.

7. The method of claim 1 further comprising adjusting transmit powers of the subcarriers based on the predicted expected power requirements.

8. The method of claim 1, wherein the prediction of the expected power requirements further comprises:
   determining at least one factor, associated with estimation of the offset, of the group consisting of ate termination, packet error, and efficiency of allocation of system resource; and
   predicting transmit power based on the determination.

9. The method of claim 1 further comprising:
   determining traffic behavior at a base station that receives transmissions from one of the access terminals over at least one of the subcarriers; and
   adjusting transmit power for the at least one of the subcarriers based on the determined traffic behavior.

10. The method of claim 9 wherein the traffic behavior relates to late termination, packet error, or inefficient allocation of system resources.

11. The method of claim 1 further comprising:
    determining signal fading associated with at least one of the subcarriers; and
    adjusting the assignment of the frequency sets of the subcarriers based on the determined fade condition.

12. The method of claim 1 further comprising adjusting a start time for transmissions by at least one of the access terminals on at least one of the subcarriers based on at least one channel condition associated with the at least one user.

13. The method of claim 12 wherein the at least one channel condition is indicated by mean data spectral efficiency for the at least one access terminal.

14. An apparatus for scheduling access terminals in a wireless communication network comprising:
    means for receiving signals from the access terminals, wherein the received signals indicate power spectral density per subcarrier reported by an access terminal as an offset from a control channel transmit power level;
    means for predicting expected power requirements for subsequent transmissions by the access terminals on subcarriers of a frequency division multiplexed reverse link based on the received signals; and
    means for assigning frequency sets of the subcarriers to the access terminals based on the predicted expected power requirements, wherein predicting the expected power requirements comprises:
      determining a second offset from the control channel transmit power level; and
      determining a power spectral density one of the access terminals for data channel transmissions based on the second offset.

15. The apparatus of claim 14 further comprising means for defining a sticky assignment by preassigning a subcarrier to one of the access terminals, wherein the preassigned subcarrier remains assigned to the one of the access terminals during subsequent subcarrier assignments until another one of the access terminals is swapped into the preassigned subcarrier.

16. The apparatus of claim 14 further comprising means for maintaining a fairness metric wherein start times for scheduling the access terminals are weighted such that service for the access terminals is proportional to channel conditions for the access terminals.

17. The apparatus of claim 14 further comprising means for predicting a data rate for at least one of the subsequent transmissions by determining a received pilot carrier to interference ratio (C/I) associated with a pilot received from one of the access terminals, applying an offset based on predicted power spectral density traffic to the pilot, predicting a data received carrier to interference ratio based on the offset, and selecting the data rate based on the predicted data received carrier to interference ratio.

18. The apparatus of claim 14 further comprising means for allocating a top-down resource allocation by selecting one of the access terminals with a smallest head of line start time and supplying the selected access terminal with a largest available resource assignment.

19. The apparatus of claim 14 further comprising means for allocating a middle-out resource allocation by selecting one of the access terminals with a smallest head of line start time and supplying the selected access terminal with a smallest available resource assignment that is greater than or equal to a resource granularity size.

20. The apparatus of claim 14 further comprising means for allocating a bottom up resource allocation by selecting one of the access terminals with a smallest head of line start time and supplying the selected access terminal with a smallest available resource assignment that is larger than a current resource assignment for the selected user.

21. The apparatus of claim 14 wherein the means for assigning frequency sets changes assignments of the subcarriers to the access terminals as a result of a change in the predicted expected power requirements for the subcarriers.

22. The apparatus of claim 14 further comprising means for adjusting transmit powers of the subcarriers based on the predicted expected power requirements.

23. A processor configured to execute the following instructions:
receiving signals from access terminals, wherein the received signals indicate power spectral density per subcarrier reported by an access terminal as an offset from a control channel transmit power level;
predicting expected power requirements for subsequent transmissions by the access terminals on subcarriers of a frequency division multiplexed reverse link based on the received signals; and
assigning frequency sets of the subcarriers to the access terminals based on the predicted expected power requirements, wherein predicting the expected power requirements comprises:
determining a second offset from the control channel transmit power level; and
determining a power spectral density one of the access terminals for data channel transmissions based on the second offset.

24. The processor of claim 23 further configured to execute the assigning of the frequency sets based on reported buffer levels, reported maximum number of subcarriers supportable by a access terminal based on maximum power constraints, and power control data transmit power spectral density in power per subcarrier.

25. The processor of claim 23 further configured to execute allocating resources via a top-down resource allocation by selecting one of the access terminals with a smallest head of line start time and supplying the selected access terminal with a largest available resource assignment.

26. The processor of claim 23 further configured to execute allocating resources via a middle-out resource allocation by selecting one of the access terminals with a smallest head of line start time and supplying the selected access terminal with a smallest available resource assignment that is greater than or equal to a resource granularity size.

27. The processor of claim 23 further configured to execute allocating resources via a bottom-up resource allocation by selecting one of the access terminals with a smallest head of line start time and supplying the selected access terminal with a smallest available resource assignment that is larger than a current resource assignment for the selected user.

28. The processor of claim 23 further configured to execute predicting a data rate for at least one of the subsequent transmissions by determining a received pilot carrier to interference ratio (C/I) associated with a pilot received from one of the access terminals, applying an offset based on predicted power spectral density traffic to the pilot, predicting a data received carrier to interference ratio based on the offset, and selecting the data rate based on the predicted data received carrier to interference ratio.

29. The processor of claim 23 further configured to execute maintaining a fairness metric wherein start times for scheduling the access terminals are weighted such that service for the access terminals is proportional to channel conditions for the access terminals.

30. A non-transitory machine-readable medium having stored thereon machine-executable instructions for:
receiving signals from access terminals, wherein the received signals indicate power spectral density per subcarrier reported by an access terminal as an offset from a control channel transmit power level;
predicting expected power requirements for subsequent transmissions by the access terminals on subcarriers of a frequency division multiplexed reverse link based on the received signals; and
assigning frequency sets of the subcarriers to the access terminals based on the predicted expected power requirements, wherein predicting the expected power requirements comprises:
determining a second offset from the control channel transmit power level; and
determining a power spectral density one of the access terminals for data channel transmissions based on the second offset.

31. The machine-readable medium of claim 30 further comprising machine-executable instructions for defining a sticky assignment by preassigning a subcarrier to one of the access terminals, wherein the preassigned subcarrier remains assigned to the one of the access terminals during subsequent subcarrier assignments until another one of the access terminals is swapped into the preassigned subcarrier.

32. The machine-readable medium of claim 30 wherein the received signals comprise power spectral density per subcarrier reported by an access terminal.

33. The machine-readable medium of claim 30 further comprising machine-executable instructions for allocating resources based on a top-down approach comprising selecting one of the access terminals with a smallest head of line start time and supplying the selected access terminal with a largest available resource assignment.

34. The machine-readable medium of claim 30 further comprising machine-executable instructions for changing assignments of the subcarriers to access terminals as a result of a change in the predicted expected power requirements for the subcarriers.

35. The machine-readable medium of claim 30 further comprising machine-executable instructions for adjusting transmit powers of the subcarriers based on the predicted expected power requirements.

36. A wireless communications apparatus, comprising:
a memory that retains data related to signals received from access terminals, wherein the received signals indicate power spectral density per subcarrier reported by an access terminal as an offset from a control channel transmit power level; and
a processor that predicts expected power requirements for subsequent transmissions by the access terminals on subcarriers of a frequency division multiplexed reverse link based on the data, and that enables assigning frequency sets of the subcarriers to access terminals based on the predicted expected power requirements,
wherein predicting the expected power requirements comprises:
determining a second offset from the control channel transmit power level; and
determining a power spectral density one of the access terminals for data channel transmissions based on the second offset.

37. The wireless communications apparatus of claim 36, wherein the processor further defines a sticky assignment by preassigning a subcarrier to one of the access terminals, wherein the preassigned subcarrier remains assigned to the one of the access terminals during subsequent subcarrier assignments until another one of the access terminals is swapped into the preassigned subcarrier.

38. The wireless communications apparatus of claim 36, wherein the processor further allocates access terminals based on a bottom-up approach by selecting one of the access terminals with a smallest head of line start time and supplying the selected access terminal with a smallest available resource assignment that is larger than a current resource assignment for the selected user.

39. The wireless communication apparatus of claim 36, wherein the received signals indicate power spectral density per subcarrier reported by an access terminal.

40. The wireless communication apparatus of claim 36 wherein the assignment of the frequency sets comprises changing assignments of the subcarriers to the access terminals as a result of a change in the predicted expected power requirements for the subcarriers.

41. The wireless communication apparatus of claim 36 wherein the assigning the frequency sets comprises:
computing data spectral density in bits per subcarrier based on the received signals, wherein the received signals transmit power spectral density per subcarrier reported by the access terminals; and
determining a quantity of subcarriers for sending data based on buffer levels reported by the access terminals and the computed data spectral density in bits per subcarrier.

42. The wireless communication apparatus of claim 36 wherein the processor adjusts transmit powers of the subcarriers based on the predicted expected power requirements.

43. A method of scheduling users in a wireless communication network comprising:
receiving signals from access terminals;
predicting expected power requirements for subsequent transmissions by the access terminals on subcarriers of a frequency division multiplexed reverse link based on the received signals; and
assigning frequency sets of the subcarriers to the access terminals based on the predicted expected power requirements, wherein:
the received signals indicate power spectral density information received from one of the access terminals;
the received power spectral density information is reported as a first offset from a control channel transmit power level;
transmit power for a data channel for the one of the access terminals is set as a second offset from the control channel transmit power level;
the prediction of the expected power requirements comprises determining the second offset, and determining data spectral density supportable by the one of the access terminals based on the received power spectral density information and the second offset; and
the assignment of the frequency sets of the subcarriers comprises determining a quantity of the subcarriers that are supportable for transmissions on the data channel based on the determined data spectral density supportable by the one user.

44. The method of claim 43 further comprising:
determining traffic behavior at a base station that receives the transmissions on the data channel; and
adjusting the second offset based on the determined traffic behavior.

45. The method of claim 44 wherein the traffic behavior relates to late termination, packet error, or inefficient allocation of system resources.

46. The method of claim 43 further comprising adjusting transmit power for at least one of the subcarriers based on the received power spectral density information.

47. A method of scheduling users in a wireless communication network comprising:
receiving signals from access terminals;
predicting expected power requirements for subsequent transmissions by the access terminals on subcarriers of a frequency division multiplexed reverse link, wherein predicting the expected power requirements comprises inferring, upon sending by a scheduler component a conflicting resource assignment message to a first access terminal, whether to reassign a resource previously assigned to a second access terminal; and
assigning frequency sets of the subcarriers to the access terminals based on the predicted expected power requirements.

48. The method of claim 47, wherein the received signals indicate power spectral density per subcarrier reported by an access terminal as an offset from a closed loop power controlled pilot.

49. The method of claim 48, wherein predicting the expected power requirements further comprises:
determining a second offset from the closed loop power controlled pilot; and
determining a power spectral density that is supportable by the access terminal for data channel transmissions based on the second offset.

50. The method of claim 47, wherein the assignment of the frequency sets comprises determining a quantity of the subcarriers that are supportable for the data channel transmissions based on the determined supportable power spectral density.

51. The method of claim 47, further comprising adjusting transmit power of at least one subcarrier based on the predicted expected power requirements.

* * * * *